March 27, 1928. 1,664,063
W. CRITSER
VEHICLE SIGNAL
Filed April 15, 1926 2 Sheets-Sheet 1
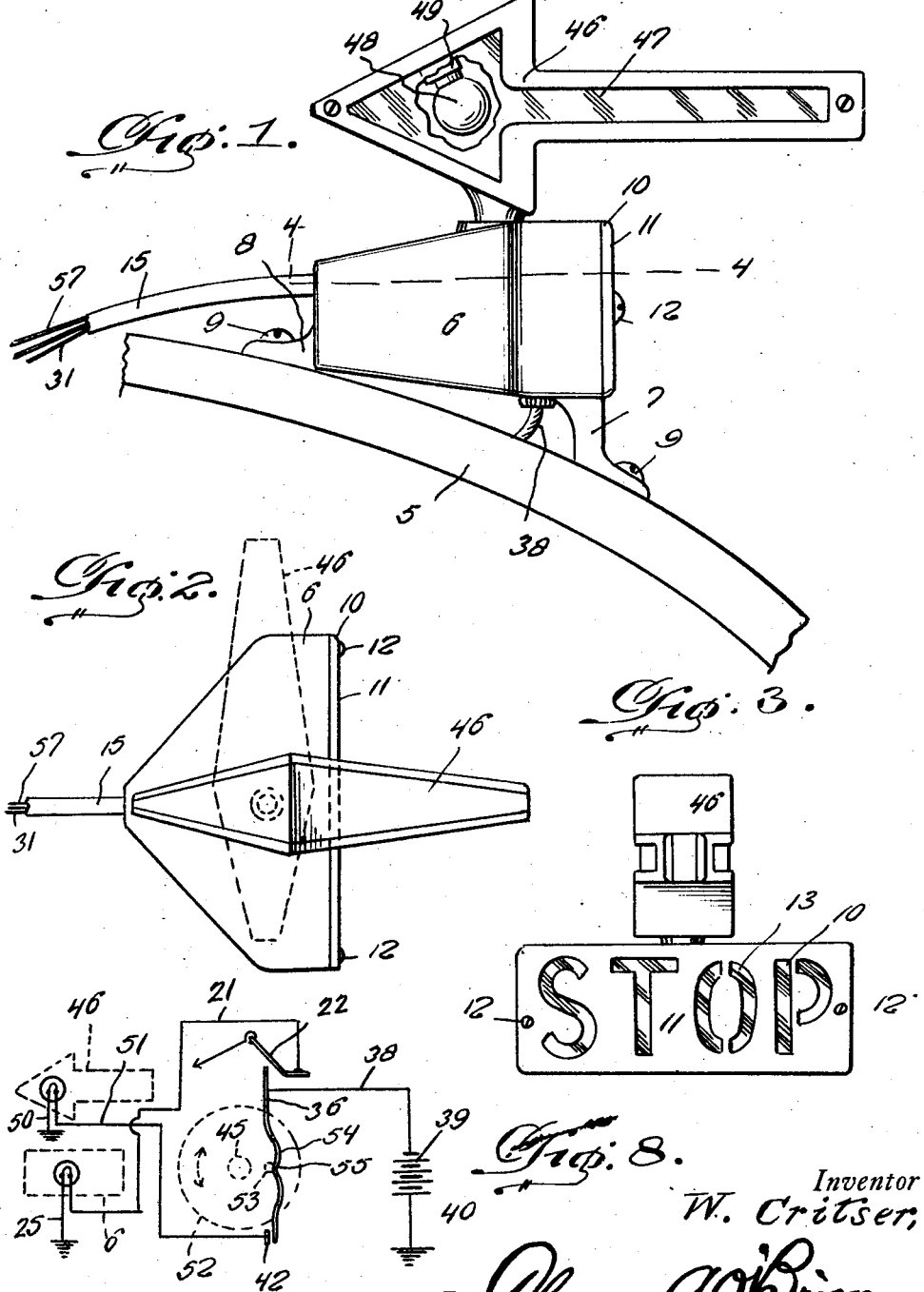

March 27, 1928.                               1,664,063
W. CRITSER
VEHICLE SIGNAL
Filed April 15, 1926            2 Sheets-Sheet 2
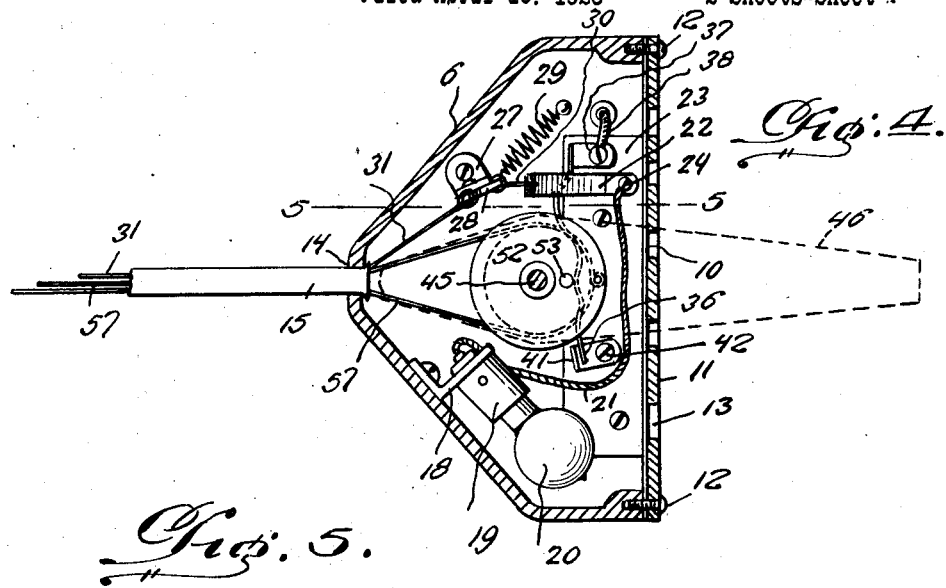
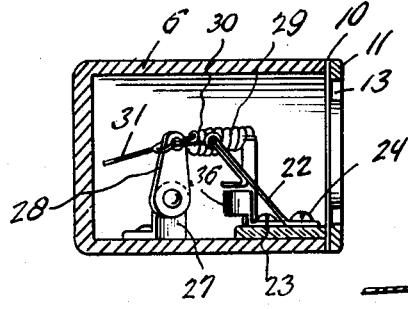
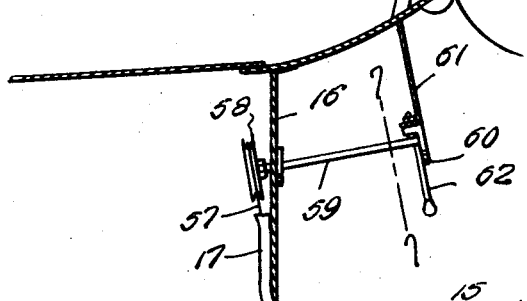
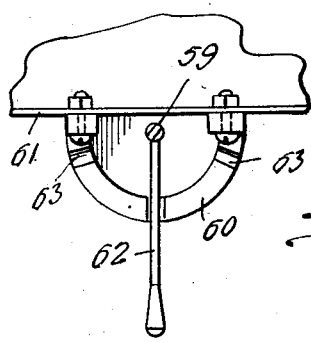
Inventor
W. Critser,
By Clarence A. O'Brien
Attorney Patented Mar. 27, 1928.

1,664,063

UNITED STATES PATENT OFFICE.

WILLIAM CRITSER, OF TRAVERSE CITY, MICHIGAN, ASSIGNOR TO ALBERT W. BONNELL, OF TRAVERSE CITY, MICHIGAN.

VEHICLE SIGNAL.

Application filed April 15, 1926. Serial No. 102,197.

The present invention relates to a vehicle signal designed particularly for use upon automobiles, and may be located in any convenient position, preferably on the rear left hand center.

An important object of the invention resides in the provision of a signal of this nature for indicating in which direction the driver of an automobile intends to turn.

Another very important object of the invention resides in the provision of a signal of this nature with direction indicating means that will light up and turn to point to the direction of the intended turn.

Another very important object of the invention lies in the provision of an exceedingly compact combination signal including direction signalling means and "stop" signalling means.

A still further very important object of the invention resides in the provision of a signal of this nature with an exceedingly simple construction, one which is thoroughly reliable and efficient in its operation, easily and conveniently manipulated, comparatively inexpensive to manufacture, strong and durable, not likely to easily become out of order, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawing,

Figure 1 is a side elevation of the signal embodying the features of my invention, showing the same mounted on a fender, Fig. 2 is a top plan view thereof, Fig. 3 is a rear elevation thereof, Fig. 4 is a horizontal section taken substantially on the line 4—4 of Fig. 1, Fig. 5 is a vertical section taken substantially on the line 5—5 of Fig. 4, Fig. 6 is a fragmentary sectional view taken through the cowl of an automobile or like vehicle, showing the operating mechanism for the signal, Fig. 7 is an enlarged detail section taken substantially on the line 7—7 of Fig. 6, and Fig. 8 is a diagrammatic view showing the circuits incident to the signal.

Referring to the drawing in detail, it will be seen that 5 designates the rear left hand fender of an automobile on which the signal is adapted to be supported. It is to be understood, of course, that the signal may be supported in any other convenient or desirable location on the automobile or like vehicle. The numeral 6 denotes a casing mounted on brackets 7 and 8 which are fixed to the fender 5 or other support by suitable fastening elements 9. The rear end of the casing 6 is open and has extended thereacross a transparent panel 10 and an opaque panel 11 held assembled to the casing by suitable fastening elements 12. The opaque panel 11 has openings 13 shaped to form suitable indicia such as the word "Stop," or the like.

An opening 14 is provided in the front end of the casing 6 for receiving one end of a tubular guide 15 which extends forwardly under the automobile body 16 and then upwardly as is indicated specifically at 17 in Fig. 6. A bracket 18 is mounted in the casing 6 to one side thereof and supports a socket 19 for receiving an incandescent bulb 20 preferably of the well known single contact type.

An electric wire 21 leads from the socket 19 to a spring contact 22 mounted on an insulating base 23 in the bottom and rear portion of the casing 6. The wire 21 is engaged with the contact 22 by a screw or like fastening element 24 which also holds one end of the spring contact 22 on the insulating base 23. This spring contact 22 inclines upwardly and forwardly as is clearly seen in Fig. 5. As is shown diagrammatically in Fig. 8, the socket 19 is grounded as at 25 through the bracket 18, casing 6 and the automobile.

A bracket 27 is mounted on the bottom of the casing 6 rising inwardly therefrom and has pivoted thereon an arm 28 which is held in a predetermined position by a spring 29. A connector 30 is engaged with the upper end of the spring contact 22 and the upper end of the arm 28. A flexible member 31 is engaged with the upper end of the arm 28 and is trained through the guide tube 19 coming out of an opening 32 provided therein and engaged by a suitable clamp 33 with the brake rod 34.

A spring contact 36 has one end engaged on the base 23 by a fastening element 37 which also engages therewith a wire 38 leading from a battery or other suitable source of electrical energy 39 which is grounded at 40. This spring contact 36 normally has its terminals spaced from a fixed contact 41 as will be explained hereinafter, said fixed contact 41 being mounted on the base by a screw 42 or some other suitable fastening element.

When the brake of the automobile is applied, the movement of the brake rod 34 pulls upon the flexible member 31 for rocking the arm 28, tensioning the spring 29, and pulling downwardly through the connector 30 on the spring contact 22 so as to engage said contact 22 with the contact 36, thereby closing a circuit to the incandescent bulb 20 as will be quite apparent from an inspection of Fig. 8, thus lighting up the casing 6 to display the "Stop" signal.

A shaft 45 is journaled vertically in the casing 6 and extends through the top thereof, the upper end of said shaft having mounted thereon an auxiliary signal casing 46. This auxiliary signal casing 46 is arrow-shaped and has arrow-shaped transparencies 47 therein, an incandescent bulb 48 being mounted in the head portion of the auxiliary casing 46. This incandescent bulb 48 is mounted in an electric socket 49, the socket 49 and the bulb 48 being of the well known signal contact type. The bulb 48 is shown as grounded diagrammatically in Fig. 8, as at 50 and a wire 51 leads from the bulb to the stationary contact 42. A sheave 52 is fixed to the shaft 45 and has a pin 43 mounted eccentrically thereof for engaging the spring contact 36, which is bent to provide a pair of depressions 54 separated by a hump 55.

The pin 53 is normally in engagement with the hump 55, for holding the spring contact 36 spaced from the fixed contact 42. Whenever the sheave 52 is rocked to point the arrow shaped casing 46 in either direction, pin 53 moves from engagement with the hump 55 and into engagement with one of the depressions 54 thus closing the circuit between the contact 36 and the contact 42 for lighting the incandescent bulb 48.

A continuous flexible member 57 is trained about the sheave 52 and the runs thereof extend through the tubular guide 15 and its extension 17, said flexible member 57 being trained about a second sheave 58 mounted on a shaft 59 journaled through the dash of the automobile 16. A quadrant bracket 60 is mounted on the instrument board 61 of the the body 16 and a crank 62 is mounted on the shaft 59 cooperating with the quadrant 60 so as to be disposed in any one of three positions corresponding to the notches 63 in the quadrant 60. It will thus be seen that by swinging the crank 62 to the right, the arrow casing 46 will be pointed to the right and the incandescent bulb 40 lighted, and when the crank is swung to the left, the casing 46 will be swung to the left and the bulb 48 lighted. When the crank is disposed in the central notch 63, which position is shown in Fig. 7, it will be noted that the pin 53 is engaged with the hump 55 so that the incandescent bulb 48 is not lighted.

It is thought that the construction, operation, and advantages of this invention will now be readily apparent to those skilled in this art without a more detailed description thereof. The present embodiment of the invention is exceedingly compact and convenient in construction, and possesses the advantages of simplicity, cheapness of manufacture, durability, and reliability and efficiency in operation. This embodiment has been disclosed merely by way of example, since in actual practice it attains the features of advantage enumerated as desirable in the statement of the invention and the above description.

It is apparent, however, that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

An indicator of the class described, including, in combination, a casing, a rotary element in the casing and having an eccentric pin, a signal carried by the rotating element, a stationary contact, a spring contact engageable with said stationary contact, said pin being abuttable with said spring contact to force it out of engagement with said fixed contact when the signal is in the nonoperative position, a second spring contact, means for bending the second spring contact to engage the first spring contact, a signal in open circuit with said spring contacts, and a lamp on said first mentioned signal in open circuit with the first spring contact and the stationary contact.

In testimony whereof I affix my signature.

WILLIAM CRITSER.